Sept. 11, 1956   C. F. LUCKS ET AL   2,762,963
REFERENCE CURRENT POWER SUPPLY FOR POTENTIOMETERS
Filed Feb. 19, 1953

INVENTORS.
Charles F. Lucks
Orval L. Linebrink
William C. Myers Jr.

BY  Gray, Mase,
Wilsmith, & Duncan
ATTORNEYS.

United States Patent Office 2,762,963
Patented Sept. 11, 1956

2,762,963

REFERENCE CURRENT POWER SUPPLY FOR POTENTIOMETERS

Charles F. Lucks, Orval L. Linebrink, and William C. Myers, Jr., Columbus, Ohio, assignors, by mesne assignments, to L. H. Marshall, doing business as L. H. Marshall Company, Columbus, Ohio Application February 19, 1953, Serial No. 337,822

17 Claims. (Cl. 321—18)

This invention relates to improvements in potentiometer circuits, and in particular to circuits for providing constant currents for use in potentiometer circuits.

Potentiometer circuits have been used for many years in the field of measurements. Basically, the potentiometer circuit consists of a slide wire, a source of voltage for passing a current through the slide wire, a source of potential which is to be measured, and means for indicating the quantity of the unknown potential. For example, in the measurement of temperature, this source of unknown potential is frequently a thermocouple. In usual practice, the slide wire is calibrated in terms of the potentials existing across it and the unknown voltage is connected between a movable contact and one end of the slide wire. A null detector is placed in series with the source of unknown voltage or current, and this null detector is used as an indicator in positioning the movable contact of the slide wire so that no current flows through the detector circuit. Thus, the position of the movable contact of the slide wire will indicate the magnitude of the unknown voltage. The accuracy of the instrument will necessarily depend upon the accuracy of the calibration of the slide wire and upon the stability of the current through the slide wire.

In the past, it has been common practice to use batteries as a source of supply for potentiometer circuits. This practice introduces the inherent disadvantages of using batteries. It is well known that battery voltages change with time and that their output currents will thus not remain constant over a long period of time.

It is also well known in the art that the output voltage of batteries will vary with the ambient temperature to which the battery is exposed. This will, in turn, produce inaccurate indications from the potentiometer. In order for a potentiometer circuit reading to be accurate when batteries are used as a source of supply, it is necessary for the circuit to be periodically standardized. This standardization usually requires the use of a standard cell, and a portion of the output of the battery is periodically compared with the E. M. F. of the standard cell.

Due to the great stability necessary in the current supply of a potentiometer circuit, it has not been found practical to use the conventional type of power supplies for this purpose.

It is an object of this invention to provide an economical power supply having the high stability required for potentiometer circuits.

Another object of this invention is to provide a power supply for use in potentiometer circuits that has a constant current output over long periods of time.

Still another object of this invention is to eliminate the necessity of standardization in potentiometer circuits, by providing a power supply whose output is constant and stable enough not to require periodic comparison with a standard cell.

Still another object of this invention is to provide a power supply for use in potentiometer circuits that requires a minimum amount of power expended in the actual regulation.

Still another object of this invention is to provide a power supply for use in potentiometer circuits whose output current is not affected by the ambient temperatures of the surrounding atmosphere.

Other objects and advantages of the present invention will be apparent to those skilled in the art from the following description taken in conjunction with the drawings, in which.

According to this invention, the voltage and current applied to a potentiometer circuit is regulated by means of a voltage reference tube. Variations of the current through this tube resulting from changes in the voltage of an insufficiently regulated voltage source cause the voltage across a series resistor to vary in such a manner as to keep the voltage across the voltage reference tube substantially constant. Starting means are provided to automatically fire the voltage reference tube, since the voltage required to fire the tube is substantially higher than its normal operating voltage.

Figure 1:
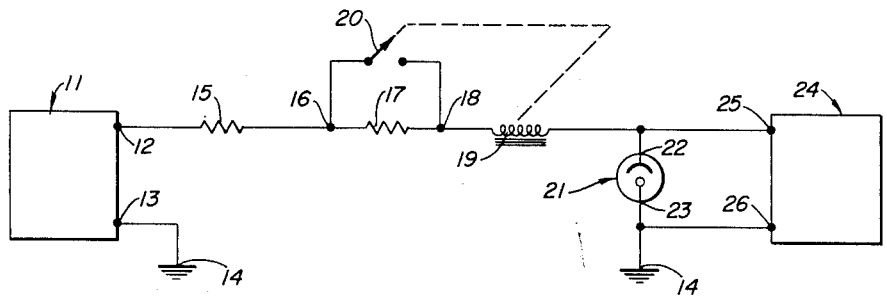
Fig. 1 illustrates the circuit of the present invention.

Referring to Fig. 1, a direct current voltage source 11 supplies an unregulated voltage to the circuit at terminals 12 and 13. The positive side of this voltage appears at terminal 12, and the negative side of the voltage appears at terminal 13, which may be grounded at point 14. Terminal 12 is connected to one side of dropping resistor 15, which is in turn connected at point 16 to dropping resistor 17. At point 18 the other end of dropping resistor 17 is connected to relay coil 19. The normally closed contacts 20 mechanically linked to relay coil 19 are connected between points 16 and 18, so that when they are closed they form a short circuit around dropping resistor 17. Voltage reference tube 21 has its plate 22 connected to relay coil 19, and its cathode 23 connected to ground point 14. Load circuit 24 is connected to the output of this circuit by positive terminal 25 which is connected to the plate 22 of voltage reference tube 21, and negative terminal 26 which is connected to the cathode 23 of voltage reference tube 21. The combination of resistors 15 and 17 may be one resistor with a movable or fixed arm at point 16.

Voltage changes occurring between points 12 and 13 will tend to change the voltage across the voltage reference tube. However, due to the action of the tube, decreases or increases in potential across the tube will cause, respectively, less or more current to flow through the tube. These changes in current through the tube cause changes in the voltage drop across dropping resistors 15 and 17. As a result of this variation in voltage drop, the voltage across the tube will remain substantially constant. Since the load circuit 24 is connected across the tube, the voltage supply to the load circuit will remain substantially constant. Thus the use of this circuit to supply a potentiometer in which the input resistance is constant results in a substantially constant current input to the potentiometer.

Figure 2:
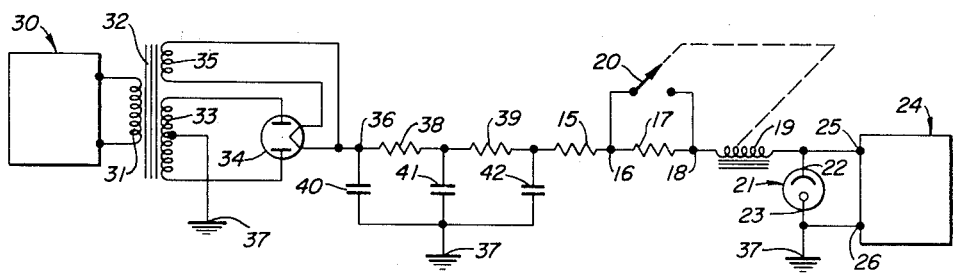
Fig. 2 illustrates a power-supply circuit including the circuit of the present invention.

Referring to Fig. 2, a source of alternating current 30 is connected to the primary 31 of power transformer 32. Plate winding 33 is connected to the plates of rectifier tube 34, and the filament of the rectifier tube is supplied from filament winding 35. Due to the action of the rectifier tube, a direct current voltage will appear between positive potential point 36 and ground 37. This voltage is filtered by means of a network consisting of resistors 38 and 39, and capacitors 40, 41, and 42. The remainder of the circuit is identical with that described in Fig. 1. Any usual type of filter network may be used in place of the described resistance capacitance filter. For better regulation, the power transformer may be a constant voltage transformer of any type (e. g., a constant voltage transformer that operates on the principle of a resonant winding).

Figure 3:
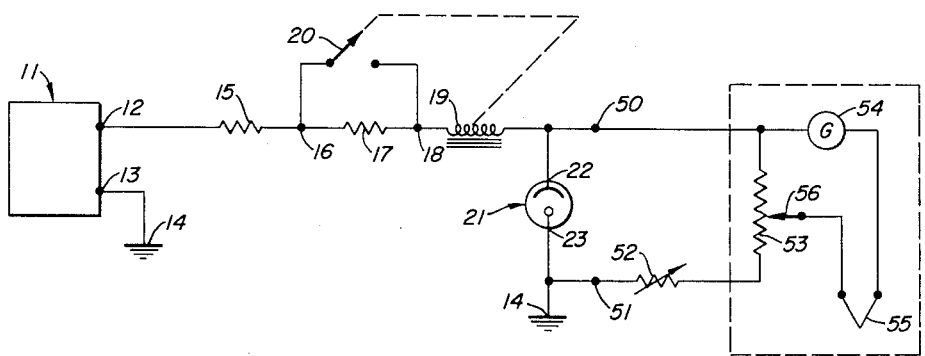
Fig. 3 illustrates the application of the present circuit in a typical potentiometer circuit for measuring temperature.

Referring to Fig. 3, the output of the voltage regulator at points 50 and 51 is connected to load circuit 57 which is representative of a basic potentiometer circuit, and consists of slide wire 53, galvanometer 54, and thermocouple 55. Adjusting the load resistor 52 will vary the current through the slide wire 53. Thus, the voltage across the slide wire may be calibrated. A countervoltage appears across the slide wire due to E. M. F. arising from the thermocouple 55. The galvanometer 54, in series with the thermocouple, will indicate whenever current flows through the thermocouple. Arm 56 of slide wire 53 is adjustable, and its position is calibrated. In operation, arm 56 is moved until no current is flowing through galvanometer 54. At this point, the voltage across the slide wire, due to the power supply, will be completely balancing out the E. M. F. of the thermocouple and the position of arm 56 will indicate the amount of voltage that was necessary to balance the thermocouple E. M. F. If the position of the arm 56 is calibrated in degrees of temperature, it will indicate the exact temperature of the thermocouple. This calibration necessarily depends for its accuracy upon the stability of the power supply current output.

Generaly, a potentiometer circuit will require less than 20 milliamperes of supply current, and often the required current is 10 milliamperes or less. The usual current for voltage reference tubes is less than 5 milliamperes, a typical tube of this type being the tube type 5651, which has a normal tube current of from 1.5 to 3.5 milliamperes. In initiating the operation of the circuit of this invention, the voltage reference tube will not fire (start to conduct) immediately since the voltage required to fire the tube is substantially higher than its normal operating voltage. In order to make the circuit self-starting, the relay (shown in series with the plate circuit of the voltage reference tube) will short out a portion of the series dropping resistors 15 and 17 when no current flows through the voltage reference tube. Thus, if the load circuit draws 10 milliamperes, and a tube type 5651 is used, the contacts of the starting relay will remain shorted until the total current through the coil of the relay indicates that the voltage reference tube is conducting. This point is determined by the portion of the series dropping resistor that is shorted out by action of the starting relay contacts, and also by the output voltage of voltage source 11.

The output voltage of voltage source 11 and the sum of the resistance of dropping resistors 15 and 17 are determined by the expression:

(1) $$\frac{V_n - V_o}{R_R + R_5 + R_7} = \frac{V_o}{R_L} + i_{VR}$$

where $V_n$ is the normal operating voltage output of voltage source 11, $V_o$ is the normal operating voltage of the voltage reference tube, $R_R$, $R_5$, $R_7$, and $R_L$ are the resistances, respectively, of the relay coil, resistances 15 and 17 and the load circuit, and $i_{VR}$ is the current flowing through the voltage reference tube when the voltage $V_o$ appears across it.

The minimum voltage output of voltage source 11 that will sustain current through the voltage reference tube within its operating range is determined by the following expression:

(2) $$V_{min} = V_1 + \left(i_1 + \frac{V_1}{R_L}\right)(R_5 + R_7 + R_R)$$

where $V_{min}$ is the minimum voltage output of voltage source 11 that will sustain current through the voltage reference tube within its operating range, $V_1$ is the minimum voltage across the voltage reference tube within its operating range, and $i_1$ is the minimum current through the voltage reference current within its operating range.

Then in order for the voltage reference tube to fire when the voltage output of voltage source 11 is of sufficient magnitude to maintain current through the voltage reference tube, the contacts of the relay must open when the current through the relay coil is equal to:

(3) $$i_f = \frac{V_{min} - V_F}{R_5 + R_R}$$

where $i_f$ is the current at which the relay must open its contacts, and $V_F$ is the voltage at which the voltage reference tube will fire.

In the design of this circuit, the desired current output must first be determined and then a selection of values of voltage output of source 11 and resistances 15 and 17 can be made to achieve this current with maximum stability. These values must be in accordance with Formula 1. Then the magnitude of current that must open contacts 16 is determined by means of Formulas 2 and 3. This value of current may be varied slightly by varying the resistance of resistors 15 and 17 (without varying their sum).

Previously, voltage regulator tubes have been employed in circuits involving this theory of regulation. Voltage regulator tubes normally are used to regulate voltages and currents in a similar manner, but require much higher tube currents than voltage reference tubes. Typical operating ranges for voltage regulator tubes are 5 milliamperes to 40 milliamperes. For good regulation, such tubes generally require from 10 milliamperes to 30 milliamperes normal tube current. For use in power supplies for potentiometer circuits, such tubes would require as much as, or more power than, that required by the potentiometer circuit. This practice necessitates the use of power supply components with higher current capacities.

By the use of voltage reference tubes in such a circuit, advantages are realized by the use of smaller current capacity components. This results in savings both economically and in physical size.

Voltage reference tubes have not previously been used in such circuits, since it was not thought that their current ranges would be large enough for good regulation. However, in the present application, where the load current is constant in magnitude and is of the order of 10 milliamperes, such tubes regulate the voltages sufficiently well for the high requirements of potentiometer circuits. This result is occasioned by the fact that the low tube currents enable the use of high series dropping resistances.

In the usual use of voltage reference tubes, the voltage across the reference tube is used to stabilize the voltage of the grid of an amplifying vacuum tube, and this second tube regulates the output voltage by various means. This method introduces a necessity of additional components, and thus a higher cost and larger size. Unless such circuits use amplification they are not of sufficient stability for use in potentiometer circuits.

This design of power supply requires a minimum of power for the actual regulation of the output voltage, and has the advantage of being able to use a low current device as a regulator. The low currents involved introduce the additional advantage of reducing the required minimum current-carrying capacities of the associated components. By reducing the required minimum current capacities of the components, and by the use of only a small number of components, the cost of a suitable regulator for potentiometer circuits has been reduced materially. The resultant decrease in size of the power supply unit makes it readily adaptable to practical applications.

The regulation of this power supply is sufficient for the high requirements of potentiometer circuits, and the output voltage is constant over long periods of time. This feature makes possible the elimination of previously required standardization against a standard cell in potentiometer circuits.

Various modifications of the placing of components in this circuit are obvious, such as the placing of the dropping resistors in the negative side of the supply, the use of a relay coil or other starting means in parallel with the voltage reference tube, or the use of other designs of voltage sources. Various other voltage reference tubes may be used, such as neon tubes or other low current gaseous voltage reference tubes. These modifications do not depart from the scope of this invention, and such different arrangements may be resorted to without departing from the spirit of the invention, or the scope of the adjoined claims.

What is claimed is:

1. In a potentiometer-type circuit containing a source of insufficiently regulated D. C. current, a current regulating circuit comprising a voltage reference tube, a series dropping resistor connected to the positive terminal of said source, a relay means, the coil of said relay means being connected between said series dropping resistor and the plate of said reference tube, said relay means providing contacts for shorting a portion of said series dropping resistor in the absence of current flow through said reference tube, and a load circuit connected between the plate and cathode of said reference tube, the cathode of said reference tube being connected to the negative terminal of said source.

2. The circuit of claim 1 in which said reference tube is designed to operate most efficiently with tube currents of 1.5 to 3.5 milliamperes.

3. The circuit of claim 1 in which said relay means comprises a normally closed contact relay whose contacts open when current flows through said reference tube.

4. The circuit of claim 3 in which said reference tube is designed to operate most efficiently with tube currents of 1.5 to 3.5 milliamperes.

5. A circuit for use in a potentiometer-type circuit comprising a source of D. C. current, said source including a constant voltage transformer and a rectifier, an A. C. filter connected to the output of said source of D. C. current, a series dropping resistor connected to the positive terminal of said filter, a relay means, the coil of said relay means being connected to said series dropping resistor, said relay means providing contacts for shorting a portion of said series-dropping resistor, a voltage reference tube whose plate is connected to said relay coil, and whose cathode is connected to the negative terminal of said filter, and a load circuit connected between the plate and cathode of said reference tube.

6. The circuit of claim 5 in which said reference tube is designed to operate most efficiently with tube currents less than 5 milliamperes.

7. The circuit of claim 5 in which said reference tube is designed to operate most efficiently with tube currents of 1.5 to 3.5 milliamperes.

8. The circuit of claim 5 in which said relay means comprises a normally closed contact relay whose contacts open when current flows through said reference tube.

9. The circuit of claim 8 in which said reference tube is designed to operate most efficiently with tube currents of 1.5 to 3.5 milliamperes.

10. In a potentiometer-type circuit, a power supply comprising a source of insufficiently regulated D. C. voltage, a series dropping resistor connected to the positive terminal of said source, starting means connected to said series dropping resistor, a voltage reference tube whose plate is connected to said starting means and whose cathode is connected to the negative terminal of said source, and a load circuit connected between the plate and cathode of said voltage reference tube, said starting means providing shorting means for shorting a portion of said series dropping resistor when no current flows through said voltage reference tube and means for removing the short from said portion when current flows through said tube.

11. The circuit of claim 10 in which the said voltage reference tube is designed such that the optimum range of tube current for good regulation is 1.5 to 3.5 milliamperes.

12. The circuit of claim 11 in which the said starting means comprises a normally closed contact relay whose contacts are open when current flows through said reference tube.

13. In a potentiometer-type circuit containing a source of insufficiently regulated D. C. voltage, a voltage regulating circuit comprising a voltage reference tube, a series dropping resistor, means for shorting out a portion of said series dropping resistor when no current flows through said voltage reference tube, and a load circuit connected between the plate and cathode of said voltage reference tube, the combined currents of said reference tube and said load circuit flowing through said series resistor, said series resistor being connected to a terminal of said source.

14. The circuit of claim 13 in which said shorting means comprises a relay in series with said series dropping resistor, the contacts of said relay shorting out a portion of said series resistance.

15. The circuit of claim 14 in which the said voltage reference tube is designed to operate most efficiently with tube currents of 1.5 to 3.5 milliamperes.

16. A circuit for use in a potentiometer-type circuit comprising a first series resistor connected to the positive terminal of a source of insufficiently regulated direct current, a second series resistor connected to said first series resistor, a relay coil connected to said second series resistor including contact means for shorting out said second series resistor, a voltage reference tube whose plate is connected to said starting means and whose cathode is connected to the negative side of said source of insufficiently regulated direct current, and a substantially constant load circuit connected between the plate and cathode of said starting means, wherein said relay coil opens said contacts when the current through said coil is of a magnitude determined by the expression:

$$i_f = \frac{V_{min} - V_F}{R_5 + R_R}$$

wherein $i_f$ is the current at which said relay coil opens said contacts, $R_R$ is the resistance of said relay coil, $R_5$ is the resistance of said first series resistor, $V_F$ is the voltage at which said voltage reference tube will fire, and $V_{min}$ is determined by the expression:

$$V_{min} = V_1 + \left(i_1 + \frac{V_1}{R_L}\right)(R_5 + R_7 + R_R)$$

where $V_{min}$ is the minimum output voltage of said source of unregulated direct current that will sustain current through said reference tube within its operating range, $V_1$ is the minimum voltage across said voltage reference tube that will sustain current through said voltage reference tube within its operating range, $i_1$ is the minimum current through said voltage reference tube within its operating range, $R_L$ is the resistance of said load circuit, $R_5$ is the resistance of said first series resistor, $R_7$ is the resistance of said second series resistor, and $R_R$ is the resistance of said relay coil.

17. A circuit for use in a potentiometer-type circuit comprising a source of insufficiently regulated direct current, a first series resistor, a second series resistor, a relay coil including contact means for shorting out said second series resistor, a voltage reference tube, and a substantially constant load circuit connected between the plate and cathode of said voltage reference tube; wherein the combined currents of said reference tube and said load circuit flow through said first series resistor, said second series resistor, and said relay coil, and said voltage reference tube is connected so that a more positive voltage appears at its plate than at its cathode; and wherein said relay coil opens said contacts when the current through said coil is of a magnitude determined by the expression:

$$i_f = \frac{V_{min} - V_F}{R_5 + R_R}$$

wherein $i_f$ is the current at which said relay coil opens said contacts, $R_5$ is the resistance of said first series resistor, $R_R$ is the resistance of said relay coil, $V_F$ is the voltage at which said voltage reference tube will fire, and $V_{min}$ is determined by the expression:

$$V_{min} = V_1 + \left(i + \frac{V_1}{R_L}\right)(R_5 + R_7 + R_R)$$

wherein $V_{min}$ is the minimum output voltage of said source of insufficiently regulated direct current that will sustain current through said reference tube within its operating range, $V_1$ is the minimum voltage across said voltage reference tube that will sustain current through said voltage reference tube within its operating range, $i_1$ is the minimum current through said voltage reference tube within its operating range, $R_L$ is the resistance of said load circuit, $R_5$ is the resistance of said first series resistor, $R_7$ is the resistance of said second series resistor, and $R_R$ is the resistance of said relay coil.

References Cited in the file of this patent

UNITED STATES PATENTS

| | | |
|---|---|---|
| 1,835,121 | Rentschler | Dec. 8, 1931 |
| 2,359,545 | Campbell | Oct. 3, 1944 |

FOREIGN PATENTS

| | | |
|---|---|---|
| 410,017 | Great Britain | May 10, 1934 |